US011430076B1

(12) United States Patent
Martin et al.

(10) Patent No.: US 11,430,076 B1
(45) Date of Patent: Aug. 30, 2022

(54) VIEW SCORES

(71) Applicant: Zillow, Inc., Seattle, WA (US)

(72) Inventors: Andrew Martin, Seattle, WA (US); Benjamin Hudson, Seattle, WA (US)

(73) Assignee: Zillow, Inc., Seattle, WA (US)

( * ) Notice: Subject to any disclaimer, the term of this patent is extended or adjusted under 35 U.S.C. 154(b) by 393 days.

(21) Appl. No.: 16/178,457

(22) Filed: Nov. 1, 2018

Related U.S. Application Data

(60) Provisional application No. 62/676,238, filed on May 24, 2018.

(51) Int. Cl.
*G06Q 50/16* (2012.01)
*G06F 16/951* (2019.01)

(52) U.S. Cl.
CPC ......... *G06Q 50/16* (2013.01); *G06F 16/951* (2019.01)

(58) Field of Classification Search
CPC ...... G06Q 50/16; G06Q 50/163; G06Q 10/10; G06Q 30/0278; H04H 60/63; G06F 16/951; G06F 30/482; G06N 20/00; G06N 3/02; G06N 5/00
USPC ................................................. 705/313, 306
See application file for complete search history.

(56) References Cited

U.S. PATENT DOCUMENTS

| | | | | |
|---|---|---|---|---|
| 8,140,421 | B1 * | 3/2012 | Humphries | G06Q 40/025 705/36 R |
| 8,676,680 | B2 * | 3/2014 | Humphries | G06Q 50/16 705/35 |
| 9,105,061 | B2 * | 8/2015 | Eraker | G06Q 30/0643 |
| 2014/0358943 | A1 * | 12/2014 | Raymond | G06Q 10/10 707/748 |
| 2015/0088766 | A1 * | 3/2015 | Krause | G06Q 30/0278 705/306 |
| 2015/0242747 | A1 * | 8/2015 | Packes | G06N 3/0454 706/17 |

FOREIGN PATENT DOCUMENTS

CN 111161417 A * 5/2020

OTHER PUBLICATIONS

Stuart E. Hamilton, Ash Morgan, Integrating lidar, GIS and hedonic price modeling to measure amenity values in urban beach residential property markets, 2010, Computers, Environment and Urban Systems 34 (2010) 133-141 (Year: 2010).*
Stuart E. Hamilton, Ash Morgan; Integrating Lidar, GIS and hedonic price modeling to measure amenity values in urban beach residential property markets, Apr. 2009 (Year: 2009).*
https://www.nerdwallet.com/article/mortgages/how-much-does-a-view-affect-a-homes-value, Marilyn Lewis Apr. 4, 2018.*
Blelloch, G.E., "Prefix Sums and Their Applications," School of Computer Science, Carnegie Mellon University, 26 pages.

(Continued)

*Primary Examiner* — Russell S Glass
(74) *Attorney, Agent, or Firm* — Perkins Coie LLP

(57) ABSTRACT

A home view data structure is described. The home view data structure is made up of multiple entries. Each entry contains information identifying a home; and a quantitative value scoring the view available from the identified home, such that the contents of the data structure are usable to compare the identified homes on the basis of the views available from them.

25 Claims, 21 Drawing Sheets

(56) References Cited

OTHER PUBLICATIONS

De Floriani, L., et al., "Algorithms for visibility computation on terrains: a survey," Environment and Planning B: Planning and Design 2003, vol. 30, pp. 709-728.
Travis, M.R., et al., "VIEWIT: computation of seen areas, slope, and aspect for land-use planning," Pacific Southwest Forest and Range Experiment Station, PSW-Nov. 1975, 11 pages.
Van Kreveld, M., "Variations on Sweep Algorithms: efficient computation of extended viewsheds and class intervals," Dept. of Computer Science, Utrecht University, 14 pages.
U.S. Appl. No. 16/457,390 for Shahbazi et al., filed Jun. 28, 2019.

\* cited by examiner

| location table 400 | | | | | | | | | | | |
|---|---|---|---|---|---|---|---|---|---|---|---|
| latitude | longitude | elevation | raw view score | slope | slope-adjusted view score | feature ids | feature-weighted view score | terrain | terrain-sensitive view score | build height | build-sensitive view score |
| 47.6324 | -122.2836 | 12m | 16 | 0.35 | 5.6 | 121 | -18 | homes | 12 | 12m | 27 |
| 47.6315 | -122.2835 | 33m | 14 | 0.15 | 2.1 | | 13 | homes | 10 | 8m | 8 |
| 47.6316 | -122.2835 | 50m | 14 | 0.12 | 1.7 | 111 | 12 | homes | 10 | 60m | 88 |
| 47.6317 | -122.2835 | 25m | 15 | 0.15 | 2.3 | | 26 | homes | 13 | 15m | 10 |
| 47.6318 | -122.2835 | 30m | 19 | 0.20 | 3.8 | | 27 | homes | 14 | 11m | 24 |
| 47.6319 | -122.2835 | 26m | 21 | 0.30 | 6.3 | | 56 | homes | 20 | 15m | 33 |
| 47.6320 | -122.2835 | 23m | 28 | 0.25 | 7.0 | | 23 | homes | 30 | 8m | 28 |
| 47.6321 | -122.2835 | 14m | 32 | 0.25 | 8.0 | | 45 | grasslands | 33 | 0m | 22 |
| 47.6322 | -122.2835 | 20m | 31 | 0.20 | 6.2 | | 74 | grasslands | 38 | 0m | 0 |
| 47.6323 | -122.2835 | 9m | 31 | 0.22 | 6.8 | | 19 | grasslands | 35 | 12m | 36 |
| 47.6324 | -122.2834 | 8m | 24 | 0.33 | 7.9 | 121 | 12 | waterbody | 28 | 16m | 41 |

*FIG. 4*

| feature id | city | feature category |
|---|---|---|
| 111 | | mountains |
| 112 | | water |
| 113 | | forests |
| 114 | | skyline |
| 115 | | dumps |
| 116 | | freeways |
| 117 | | factories |
| 118 | | clearcuts |
| 119 | Seattle, Washington | Mt. Rainier |
| 120 | Seattle, Washington | Space Needle |
| 121 | Seattle, Washington | Mercer Mess |
| 122 | Milwaukee, Wisconsin | Milwaukee Art Museum |
| 123 | Milwaukee, Wisconsin | Mitchell Park Horticultural Conservatory |

*FIG. 9* standard feature preference level table ─1000

| feature id | preference level | |
|---|---|---|
| 111 | +5 | ─1011 |
| 112 | +5 | ─1012 |
| 113 | +5 | ─1013 |
| 114 | +5 | ─1014 |
| 115 | -6 | ─1015 |
| 116 | -4 | ─1016 |
| 117 | -10 | ─1017 |
| 118 | -8 | ─1018 |
| 119 | +10 | ─1019 |
| 120 | +8 | ─1020 |
| 121 | -2 | ─1021 |
| 122 | +6 | ─1022 |
| 123 | +6 | ─1023 |
| ─1001 | ─1002 | |

*FIG. 10*

To customize the view scores that Zillow displays to you, adjust the preference ratings below to reflect your view preferences:

mountains : +5       dumps:        : -6
water     : +5       freeways      : -4
forests   : +5       factories     : -10
skyline   : +5       clearcuts     : -8

Mt. Rainier   : +10   Mercer Mess : -2
Space Needle: +8

Submit

*FIG. 13*

To customize the view scores that Zillow displays to you, adjust the preference ratings below to reflect your view preferences:

| | | |
|---|---|---|
| mountains : | +9 | ─1411 |
| water : | +6 | ─1412 |
| forests : | +10 | ─1413 |
| skyline : | -4 | ─1414 |

| | | |
|---|---|---|
| dumps: : | -6 | ─1421 |
| freeways : | -4 | ─1422 |
| factories : | -10 | ─1423 |
| clearcuts : | -8 | ─1424 |

Mt. Rainier : +10 ─1416    Mercer Mess : -8 ─1426
Space Needle: +6 ─1417

Submit ─1430

| feature id | preference level | |
|---|---|---|
| | user feature preference level table | ←1500 |
| 111 | +9 | ←1511 |
| 112 | +6 | ←1512 |
| 113 | +10 | ←1513 |
| 114 | -4 | ←1514 |
| 115 | -6 | ←1515 |
| 116 | -4 | ←1516 |
| 117 | -10 | ←1517 |
| 118 | -8 | ←1518 |
| 119 | +10 | ←1519 |
| 120 | +6 | ←1520 |
| 121 | -8 | ←1521 |
| 122 | | ←1522 |
| 123 | | ←1523 |
| ↖1501 | ↖1502 | |

*FIG. 15*

VIEW SCORES

CROSS-REFERENCE TO RELATED APPLICATIONS

This application claims the benefit of and incorporates by reference U.S. Provisional Patent Application No. 62/676,238, filed on May 24, 2018, entitled "VIEW SCORES." Where the present application conflicts with anything incorporated by reference, the present application controls

BACKGROUND

When people shop for a home to buy or rent, in many cases they consider what can be seen from each home, sometimes referred to as the home's "view."

When a home is listed for sale, the listing agent often characterizes the view from the listed home using standardized categories such as "mountain," "water," and "territorial."

BRIEF DESCRIPTION OF THE DRAWINGS

FIG. 4 is data structure diagram showing sample contents of a location table used by the facility in some embodiments to store information about different geographic locations, including their elevations.

FIG. 9 is a data structure diagram showing sample contents of a feature table used by the facility in some embodiments to store information about a visual feature in connection with its feature ID.

FIG. 10 is a data structure diagram showing sample contents of a standard feature preference level table.

FIG. 13 is a display diagram showing a sample visual user interface presented by the facility in some embodiments to enable a user to specify custom feature preference levels that reflect the user's visual feature preferences.

FIG. 14 is a display diagram showing a sample display presented by the facility in some embodiments containing feature preference levels as adjusted by a user for a custom set of visual feature preference levels for that user.

FIG. 15 is a data structure diagram showing sample contents of a user-feature preference level table used by the facility in some embodiments to store per-user custom preference levels for visual features.

DETAILED DESCRIPTION

Figure 1:
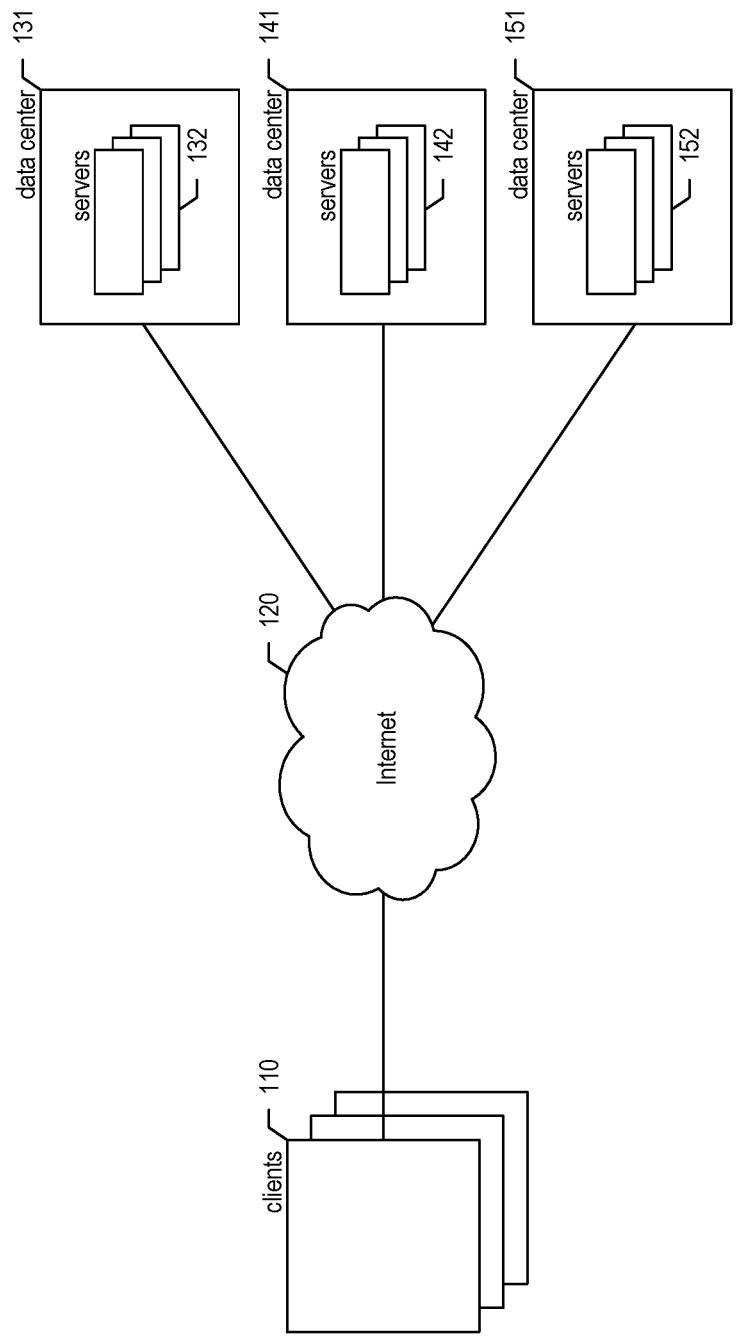
FIG. 1 is a network diagram showing an environment in which the facility operates in some embodiments.

The inventors have recognized that many people searching for a home to buy or rent would appreciate having more information about a candidate home's view than which standardized categories it falls into. In particular, the inventors have recognized that a quantitative score characterizing the view from a home will be valuable to many home seekers.

Accordingly, the inventors have conceived and reduced to practice a software and/or hardware facility for determining a quantitative view score for a perspective geographic location, such as the geographic location of a home or other building from which the quality and/or extensiveness of the view is to be scored ("the facility").

In some embodiments, the facility represents a geographic region in which view scores are determined as a grid of rectangles, such as rectangles that are squares having side length 10 m, squares having side length 0.0001° longitude and latitude, etc. In some embodiments, the facility determines view scores of various types for a perspective geographic location based upon a determination of which rectangles other than the rectangle containing the geographic location are visible from the rectangle containing the perspective geographic location. In some embodiments, the facility determines view scores of a variety of types by identifying any rectangle to which a straight line segment can be projected from the rectangle containing the perspective geographic location without being obstructed by a third rectangle line between the first two. This process is referred to at times herein as "identifying rectangles visible" from the perspective geographic location, or "identifying other geographic locations visible" from the perspective geographic location.

In some embodiments, the facility generates a raw view score by using elevation measurements for each of the rectangles to identify rectangles visible from the perspective geographic location, and counting the rectangles identified as visible. The raw view score reflects the outlook that, all other considerations being equal, being able to see more visible land area is better than being able to see less of it.

In some embodiments, the facility generates a slope-adjusted view score by determining a topographical slope at the perspective geographic location, and multiplying the raw view score for the perspective geographic location by the slope. The slope-adjusted view score reflects the observation that it is more likely for significant surrounding land area to be visible from a point on a steep slope than from a point on a shallow slope.

In some embodiments, the facility generates a feature-weighted view score by identifying among the rectangles visible from the perspective geographic location those that contain visual features of interest. Such a visual feature may be unique, such as Mount Rainier, the Milwaukee Museum of Art, or Niagara Falls. On the other hand, such a visual feature may instead be a category that recurs in multiple geographic locations, such as a skyline, a body of water, or a sports stadium. A visual feature may be generally regarded as positive—such as a forest—or negative—such as a garbage dump. In some embodiments, the facility determines a feature preference level for each visual feature visible from the perspective geographic location. In some embodiments, the facility provides a standard or default set of feature preference levels for the different features of which it is aware; this standard set of feature preference levels is intended and prepared to reflect common viewpoints and preferences on different features. In some embodiments, the facility allows a particular user to explicitly construct his or her own customized set of feature preference levels, which are tailored specifically to that user's feature preferences. For example, a generalized high level of regard for Mount Rainier may lead the feature preference level for the Mount Rainier visual feature to be strongly positive in the standard set of feature preference levels, such as +9; in the customized set of feature preference levels for a particular user who is reminded of the great destruction that a volcanic eruption can cause when he or she sees Mount Rainier, on the other hand, the feature preference level for the Mount Rainier visual feature may be strongly negative, such as −8. In some embodiments, the facility automatically infers a partial or complete customized set of feature preference levels for a user, such as by monitoring the user's interactions with home detail pages of various homes from which different visual features are visible; for example, when a user spends a significant amount of time viewing a significant number of home detail pages for homes that have a view of Niagara Falls, the facility infers a large positive preference level for this visual feature. To generate the feature-weighted view score for a perspective geographic location, the facility counts the rectangles visible from the perspective geographic location, weighting each visible rectangle containing a visual feature by the positive or negative feature preference level established for the visual feature by the set of feature preference levels being used.

In some embodiments, the facility determines a terrain-sensitive view score by performing the identification of rectangles visible from the perspective geographic location based upon a terrain type determined for the rectangle containing the perspective geographic location, the rectangles whose visibility is being considered, and/or intervening rectangles. For example, if a rectangle whose visibility is being considered has a "trees" terrain type, it may be more likely to be seen from a distance than a rectangle having a "grass" terrain type, and therefore more likely to be identified as visible from a particular perspective geographic location. On the other hand, where the rectangle containing the perspective geographic location and/or intervening rectangles have the "trees" terrain type, it may be less likely to be able to see the rectangle whose visibility is being considered than if the rectangle containing the perspective geographic location and/or intervening rectangles have the "trees" terrain type, and therefore less likely to be identified as visible from the perspective geographic location. In some embodiments, the facility determines the terrain-sensitive view score by counting the number of rectangles identified as visible using this approach, either with or without feature-weighting.

In some embodiments, the facility determines a build-sensitive view score using information about the height of any building on each rectangle. In particular, in some embodiments, the facility treats the elevation of each rectangle as the sum of the rectangle's ground elevation and build height.

In some embodiments, as part of identifying rectangles visible from a particular perspective geographic location, the facility uses the ground elevation at that geographic location. In some embodiments, the facility uses the sum of ground elevation and build height at the geographic location. In some embodiments, the facility uses an elevation determined dynamically relative to the ground elevation, such as the height above the ground of a building proposed to be built in the geographic location, or a particular floor of this building below the building's highest point, or a new ground elevation whose creation by excavating or mounding is proposed.

In some embodiments, the facility causes one or more kinds of view scores to be delivered or displayed. For example, in some embodiments, the facility causes home detail pages of a home information website to include one or more kinds of view scores for a perspective corresponding to the home. In some embodiments, the facility allows a user to search for homes having view scores in a particular range, such as homes having view scores no smaller than a minimum view score specified by the user. In some embodiments, the facility allows a user to search for homes from which a particular visual feature is visible. In some embodiments, the view scores used by the facility in these ways are generated using a customized, per-user set of feature preference levels.

By performing in some or all of these ways, the facility helps home seekers to more easily select candidate homes whose views are consistent with their preferences. Also, by performing in some or all of these ways, the facility reduces the levels of computing resources that would otherwise be required to provide similar kinds of assistance, allowing them to be provided with fewer and/or less powerful and/or less costly computing devices; fewer and/or less capacious and/or less costly storage devices; less network capacity; less latency; etc.

FIG. 1 is a network diagram showing an environment in which the facility operates in some embodiments. The network diagram shows clients 111-113 used by users. Each of the clients executes software, such as web browsers or specialized application programs, to communicate with one or more servers 131 and 132—such as servers in data centers—via the Internet 120 or one or more other networks. In some embodiments, the servers and/or data centers are distributed geographically to provide disaster and outage survivability, both in terms of data integrity and in terms of continuous availability. Distributing the data centers geographically also helps to minimize communications latency with clients in various geographic locations.

In some embodiments, the facility uses the servers to determine, present, and/or search on view scores on behalf of users using the clients.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different devices may be used as clients, including desktop computer systems, laptop computer systems, automobile computer systems, tablet computer systems, smart phones, smart watches and other wearable computing devices, personal digital assistants, televisions, cameras, etc.

Figure 2:
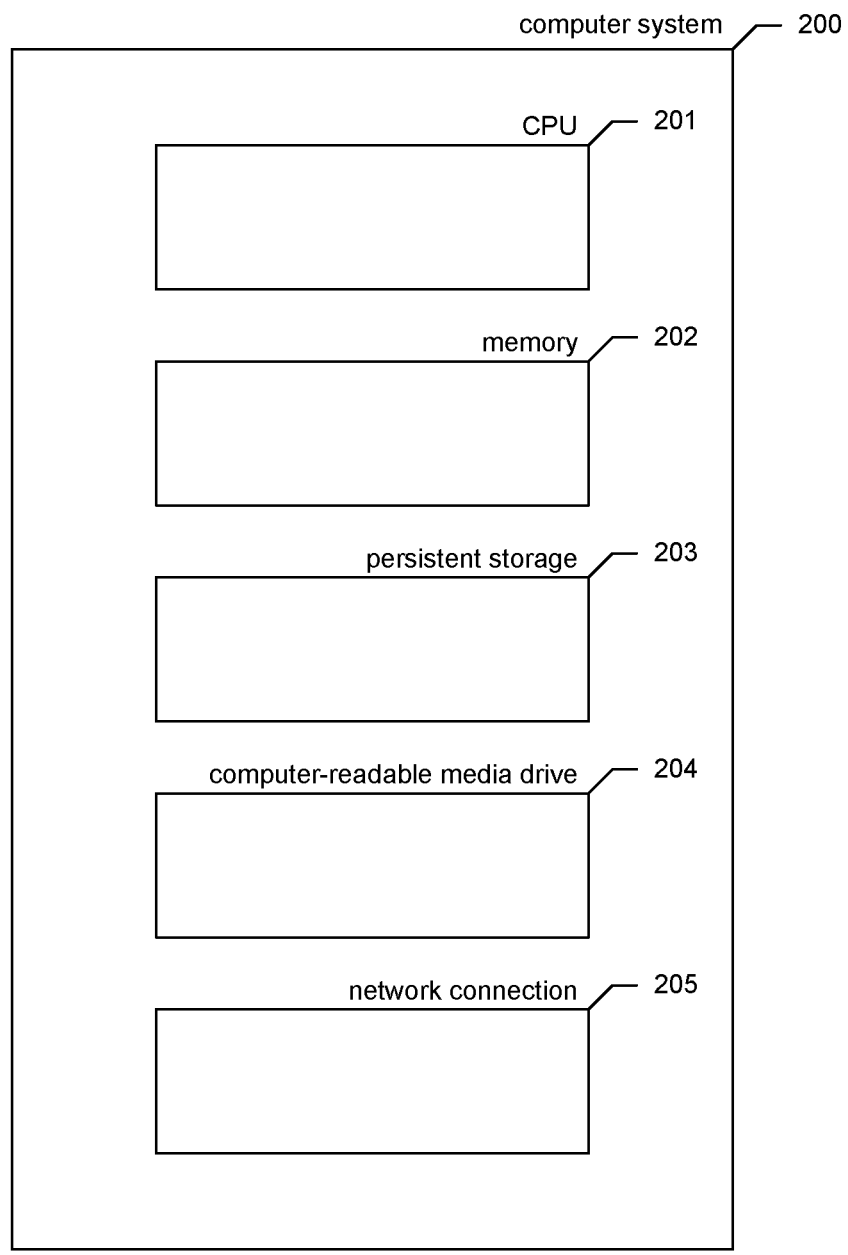
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, tablets, mobile phones, personal digital assistants, televisions, cameras, automobile computers, electronic media players, smart watches and other wearable computing devices, etc. In various embodiments, the computer systems and devices include one or more of each of the following: a central processing unit ("CPU"), graphics processing unit ("GPU"), or other processor 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components. In various embodiments, the computing system or other device also has some or all of the following hardware components: a display usable to present visual information to a user; one or more touchscreen sensors arranged with the display to detect a user's touch interactions with the display; a pointing device such as a mouse, trackpad, or trackball that can be used by a user to perform gestures and/or interactions with displayed visual content; an image sensor, light sensor, and/or proximity sensor that can be used to detect a user's gestures performed nearby the device; and a battery or other self-contained source of electrical energy that enables the device to operate while in motion, or while otherwise not connected to an external source of electrical energy.

Figure 3:
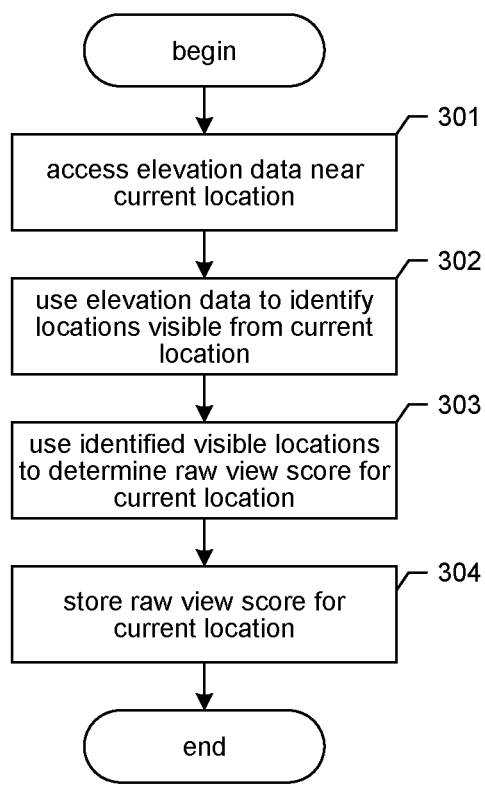
FIG. 3 is a flow diagram showing a process performed by the facility in some embodiments to generate a raw view score for a perspective geographic location.

FIG. 3 is a flow diagram showing a process performed by the facility in some embodiments to generate a raw view score for a perspective geographic location. In some embodiments, the facility performs this process and others described herein for determining view scores of various types in response to an explicit request from a user with respect to the perspective geographic location, a home at the perspective geographic location, an address at the perspective geographic location, etc. In some embodiments, the facility performs these processes in response to a user's request for information containing the view score, such as a web page containing the view score whose subject is a home at the perspective geographic location, an address at the perspective geographic location, etc. In some embodiments, the facility performs these processes for each of a number of different perspective geographic locations such as a set of geographic locations of homes that are each the subject of a different web page (sometimes called a "home detail page").

In act 301, the facility accesses elevation data for geographic locations near the perspective geographic location for which the view score is being determined, which is sometimes referred to herein as the "current location" for determining a view score.

FIG. 4 is data structure diagram showing sample contents of a location table used by the facility in some embodiments to store information about different geographic locations, including their elevations. The location table 400 is made up of rows, such as rows 451-461, that each correspond to a different location. In some embodiments, this location is a rectangle, triangle, hexagon, pentagon, circle, or other shape, identified by contents of a latitude column 401 and a longitude column 402. In some embodiments, the values in the latitude and longitude column refer to the center of the shape to which the row corresponds, or a particular corner of the shape, such as the northwest corner. An elevation column 403 contains an indication of a ground elevation for the shape, which may be obtained directly or indirectly via various surveying techniques. In various embodiments, the elevation value seeks to reflect the ground elevation in the center of the shape; the ground elevation in a particular corner of the shape, such as the northwest corner; a mean, median, mode, or other aggregation of elevations taken at various points within the shape; etc. For example, row 456 indicates that a location or shape at latitude 47.6319° and longitude −122.2835° has a ground elevation of 26 meters. The location table contains additional columns, which are discussed below.

While FIG. 4 and each of the data structure diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may divide the shown information across two or more different tables; may be compressed and/or encrypted; may be indexed; may contain a much larger number of rows than shown, etc.

Returning to FIG. 3, in act 302, the facility uses the elevation data accessed in act 301 to identify other locations that are visible from the perspective geographic location.

Figure 5:
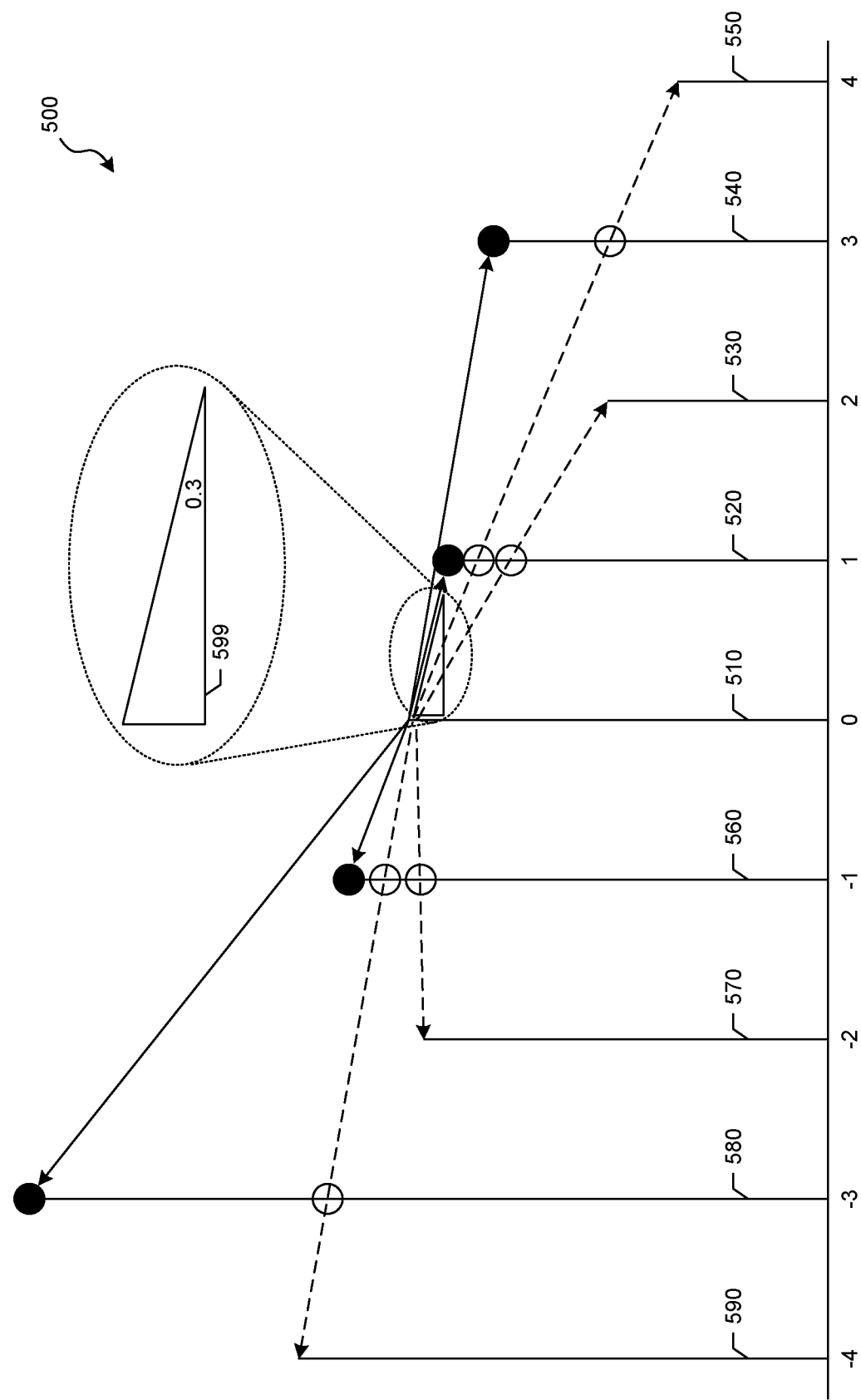
FIG. 5 is a ray-tracing diagram that illustrates a process used by the facility in some embodiments to identify locations visible from a particular location.

FIG. 5 is a ray-tracing diagram that illustrates a process used by the facility in some embodiments to identify locations visible from a particular location. For each of a surrounding set of locations, the facility attempts to draw a ray from the elevation at the perspective geographic location (represented here by rectangles elevation segment 510) to the elevation at the other locations, and determines whether it intersects any of the intervening elevation line segments. As shown, rays that don't intersect any elevation segment can be drawn to the top of elevation segments 520, 540, 560, and 580, and to none of elevation segments 530, 550, 570, and 590. Accordingly, the locations corresponding to elevation segments 520, 540, 560, and 580 (i.e., the locations to which rows 453, 455, 457, and 459 of the location table correspond) are identified by the facility as visible from the perspective geographic location. While this process is shown only for a short distance in a single dimension in FIG. 5, those skilled in the art will appreciate that it is actually performed by the facility in two dimensions for distances that are potentially much greater, such as one mile, ten miles, one hundred miles, etc.

In some embodiments, the facility uses an optimized technique to determine the locations visible from a particular location. For example, in some embodiments, the facility uses a line of sight technique, described in the following articles, each of which is hereby incorporated by reference in its entirety: (1) L. De Floriani & P. Magillo, "Algorithms for visibility computation on terrains: a survey," Dept. of Computer and Information Sciences (DISI), University of Genova, *Environment and Planning B: Planning and Design* 2003, vol. 30, pp. 709-728, available at pdfs.semanticscholar.org/48d7/dac06dfc460bc4917c384986eefb8123adce.pdf; (2) M. Travis, G. Elsner, W. Iverson & C. Johnson, "VIEWIT: computation of seen areas, slope, and aspect for land-use planning," Pacific Southwest Forest and Range Experiment Station, Forest Service, U.S. Dept. of Agriculture, USDA Forest Service General Technical Report PSW-11/1975, available at www.fs.fed.us/psw/publications/documents/psw_gtr-011/gtr-011part1.pdf; (3) G. Blelloch, "Prefix Sums and Their Applications," School of Computer Science, Carnegie Mellon University, Section 1.3, pp. 44-47, available at www.cs.cmu.edu/~guyb/papers/Ble93.pdf; and (4) M. van Kreveld, "Variations on Sweep Algorithms: efficient computation of extended viewsheds and class intervals," Dept. of Computer Science, Utrecht University, available at www.bowdoin.edu/~ltoma/teaching/cs350/sring06/Lecture-Handouts/gis-viewshedsKreveld.pdf.

Figure 6:
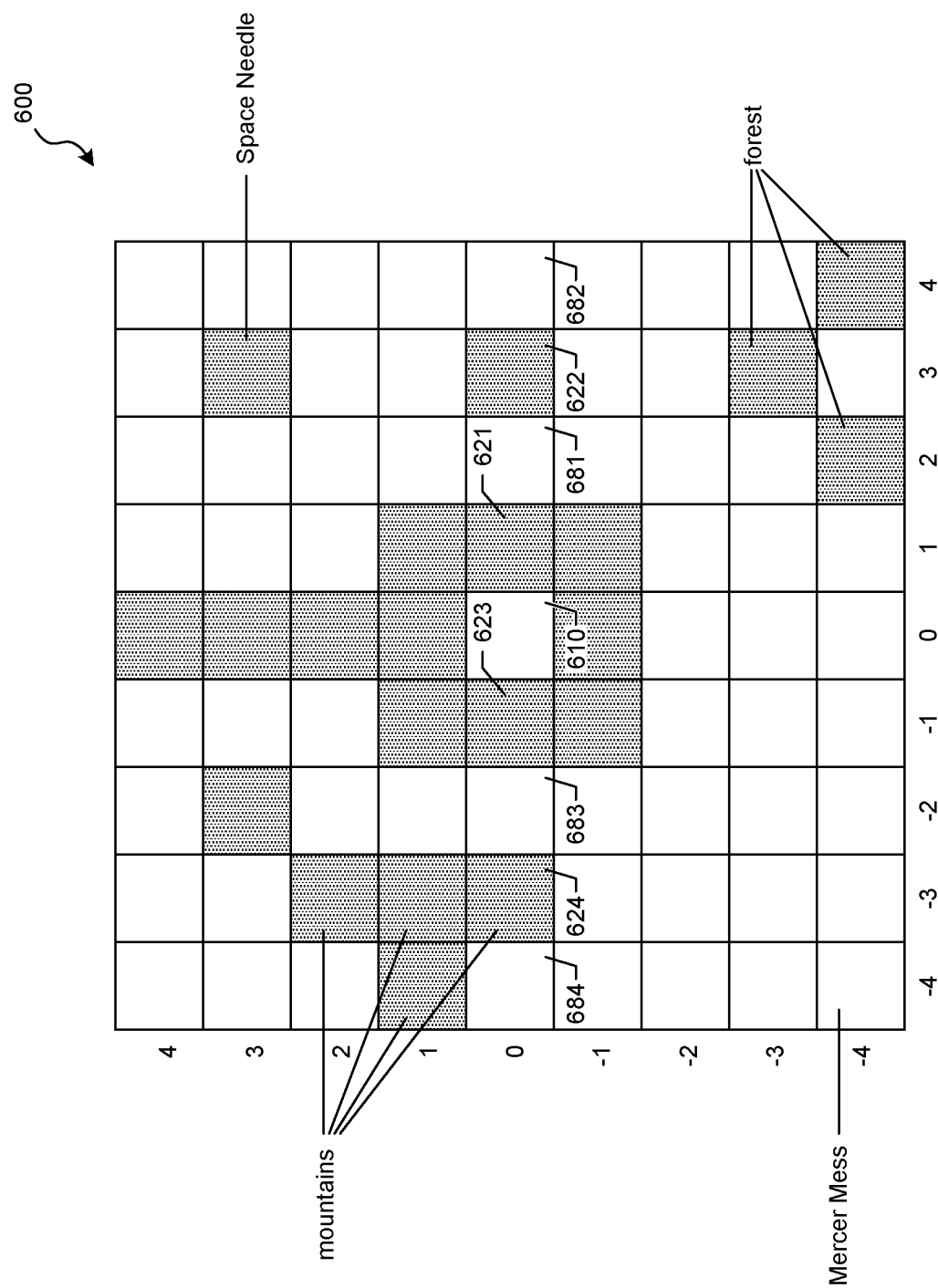
FIG. 6 is a map diagram showing the identification of locations visible from a perspective geographic location.

FIG. 6 is a map diagram showing the identification of locations visible from a perspective geographic location. In the map diagram 600, locations visible from perspective geographic location 610 are shown as dark rectangles, while locations not identified as visible from the perspective geographic location are shown as light rectangles. In the diagram, dark rectangles that indicate visibility from a perspective geographic location 621, 622, 623, and 624 correspond to the locations found visible in connection with FIG. 5, those corresponding to rows 453, 455, 457, and 459 of the location table. The map diagram also includes labels for geographic locations having particular visual features (e.g., "mountains" and "Space Needle"), which will be discussed in further detail below.

Returning to FIG. 3 in act 303, the facility uses the visible locations identified in act 302 to determine a raw view score for the current location. In some embodiments, this involves counting the identified visible locations to obtain the raw view score. In the example shown in FIG. 6, the facility determines a raw view score of 21 corresponding to the number of dark rectangles shown there. In act 304, the facility stores the raw view score for the current location. For example, the location table shown on FIG. 4 has a column 404 in which the facility stores this raw view score in some embodiments. For the example, the facility shows the raw view score of 21 at the intersection of column 404 with row 456, which corresponds to the perspective geographic location in the example. In some embodiments, the raw view score is stored in a variety of other locations. After act 304, this process concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 7:
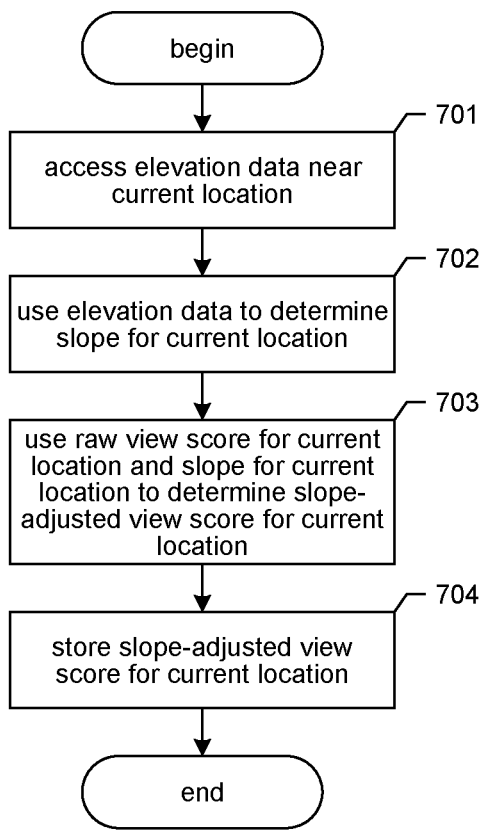
FIG. 7 is a flow diagram showing a process performed by the facility in some examples to determine a slope-adjusted view score for a perspective geographic location.

FIG. 7 is a flow diagram showing a process performed by the facility in some examples to determine a slope-adjusted view score for a perspective geographic location. In act 701, the facility accesses elevation data for geographic locations near the perspective geographic location. In act 702, the facility uses the elevation data to determine a slope for the perspective geographic location. In some embodiments, to determine this slope, the facility chooses and/or aggregates the change in elevation between the perspective geographic location and one or more of the adjacent geographic locations. For example, in various embodiments, the facility determines the minimum, mean, median, mode, or maximum change in elevation between the perspective geographic location and adjacent geographic locations; aggregates the changes in elevation between the perspective geographic location and the adjacent geographic locations beyond which lie locations identified as visible from the perspective geographic location; always chooses the change in elevation between the perspective geographic location and the adjacent geographic location in a single direction; etc. One example of such a slope determination is shown in FIG. 5, in which triangle 599 shows the slope between the perspective geographic location identified in row 456 of the location table and the adjacent geographic location identified in row 457 of the location table (i.e., all locations to which elevation line segments 510 and 520 correspond). The slope is 0.3, obtained by dividing the three meter change in elevation by the 10 meter distance between the center of the 10 meter by 10 meter rectangles.

In act 703, the facility uses a raw view score for the perspective geographic location (available from column 404 of the location table) and the slope determined in act 702 to determine the slope-adjusted view score for the perspective geographic location. In some embodiments, this involves multiplying the raw view score by the slope. In the case of the example, the facility determines a slope-adjusted view score of 6.3 by multiplying the raw view score of 21 by the slope of 0.3. In act 704, the facility stores the slope-adjusted view score determined in act 703 for the perspective geographic location, such as in column 406 of the location table. After act 704, this process concludes.

Figure 8:
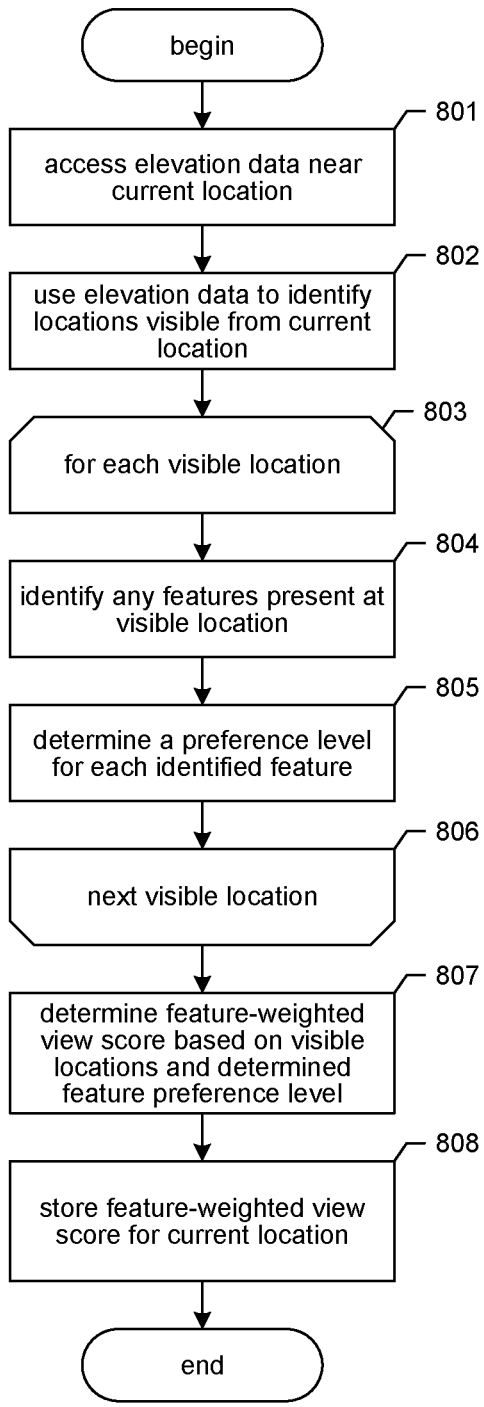
FIG. 8 is a flow diagram showing a process performed by the facility in some embodiments to determine a feature-weighted view score for a particular perspective geographic location.

FIG. 8 is a flow diagram showing a process performed by the facility in some embodiments to determine a feature-weighted view score for a particular perspective geographic location. In act 801, the facility accesses elevation data for locations near the perspective geographic location. In act 802, the facility uses the elevation data accessed in act 801 to identify locations visible from the perspective geographic location. In acts 803-806, the facility loops through each location identified as visible in act 802. In act 804, the facility identifies any features present at the current visible location. In some embodiments, the facility performs act 804 by first retrieving from the location table any feature IDs present at the intersection of feature IDs column 407 and the row to which the current visible location corresponds. For example, the location table contains the feature ID 111 at the intersection of the feature ID column 407 and row 453. In some embodiments, the facility maintains additional state constituting identifying information for features based upon their feature IDs.

FIG. 9 is a data structure diagram showing sample contents of a feature table used by the facility in some embodiments to store information about a visual feature in connection with its feature ID. The feature table 900 is made up of rows, such as rows 911-923, each corresponding to a different feature, either a unique feature or a categorical feature. (Rows 911-918 relate to categorical features, and rows 919-923 relate to unique features.) Each row is divided into the following columns: a feature ID column 901 containing a feature ID uniquely identifying the feature; a city column 902 indicating, for unique features, the city in which the feature occurs; and a feature category column 903 containing a name for the feature or feature category. For example, row 911 of the feature table indicates that the feature having feature ID 111 referred to in row 453 of the location table is "mountains." Further, row 919 indicates that the feature having feature ID 119 is a unique feature that occurs in Seattle, Wash. and is "Mt. Rainier."

Returning to FIG. 8, in act 805, the facility determines a preference level for each feature identified in act 804. This preference level indicates quantitatively how much a person wants or does not want to look at the feature from his or her home. In some embodiments, the facility establishes a standard set of preference levels for all of the visual features in the feature table, which it uses to generate feature-weighted view scores for any users whose visual feature preferences are unknown. In some embodiments, a user can specify their own custom set of feature preference levels to be used by the facility as a basis for calculating feature-weighted view scores for this user.

FIG. 10 is a data structure diagram showing sample contents of a standard feature preference level table scoring a set of preference levels for each feature ID is intended to be roughly representative of all preference levels across all users. A standard feature preference level table 1000 is made up of rows, such as rows 1011-1023, each corresponding to a different feature. Each row is divided into the following columns: a feature ID column 1001 containing the feature ID identifying the feature to which the row corresponds; a preference level column 1002 indicating the standard preference level for the feature to which the row corresponds. For example, row 1011 indicates that the "mountains" feature having feature ID 111 has the standard preference level of +5, while the "clearcuts" feature having feature ID 118 has a standard preference level of −8.

Returning to FIG. 8, in act 806, if additional visible locations remain to be processed, then the facility continues in act 803 to process the next visible location, else the facility continues in act 807. In act 807, the facility determines a feature-weighted view score based upon the visible locations identified in act 802 and the feature preference levels determined in act 805. In some embodiments, performing act 807 involves initializing the feature-weighted view score at zero; and, for each visible location, adding to the feature-weighted view score either the preference level specified for any features that the visible location, or a nominal preference level such as +1 for visible locations not having a visual feature. Performing this process based upon the information in FIGS. 6, 9, and 10 yields 20 points for mountains (feature ID 111, four squares at five points per square), 15 points for forest (feature ID 113, three squares at five points per square), 8 points for Space Needle (feature ID 120, one square at eight points per square), and 13 points for common squares having no visual features (13 squares at one point per square), for a total feature-weighted view score of 56.

Returning to FIG. 8, in act 808, the facility stores the feature-weighted view score determined in act 808 for the perspective geographic location. In some examples, the facility stores this in column 408 of the location table. After act 808, this process concludes.

Figure 11:
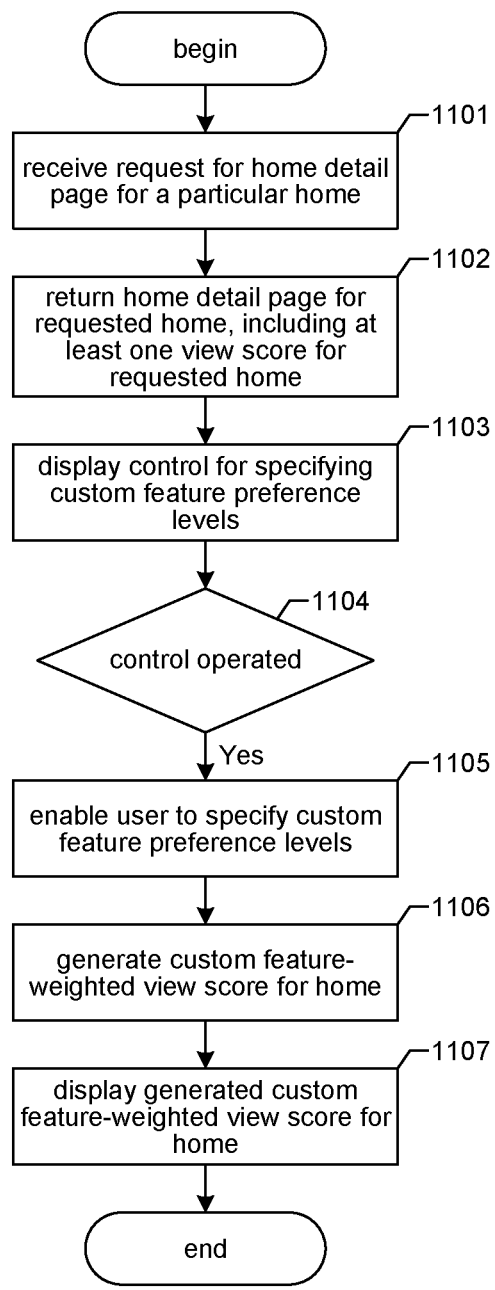
FIG. 11 is a flow diagram showing a process performed by the facility in some embodiments in order to provide a visual user interface in which a view score determined by the facility for a home is displayed as part of a home detail page containing other information about the home.

FIG. 11 is a flow diagram showing a process performed by the facility in some embodiments in order to provide a visual user interface in which a view score determined by the facility for a home is displayed as part of a home detail page containing other information about the home. In act 1101, the facility receives a request for a home detail page for a particular home. This request may, for example, identify the home by its address; select the home from a displayed set of homes, such as homes plotted on a map, homes that satisfy a search query, etc. In act 1102, the facility returns for the home for display by the client's browser a home detail page for the identified home that includes at least one view score.

Figure 12:
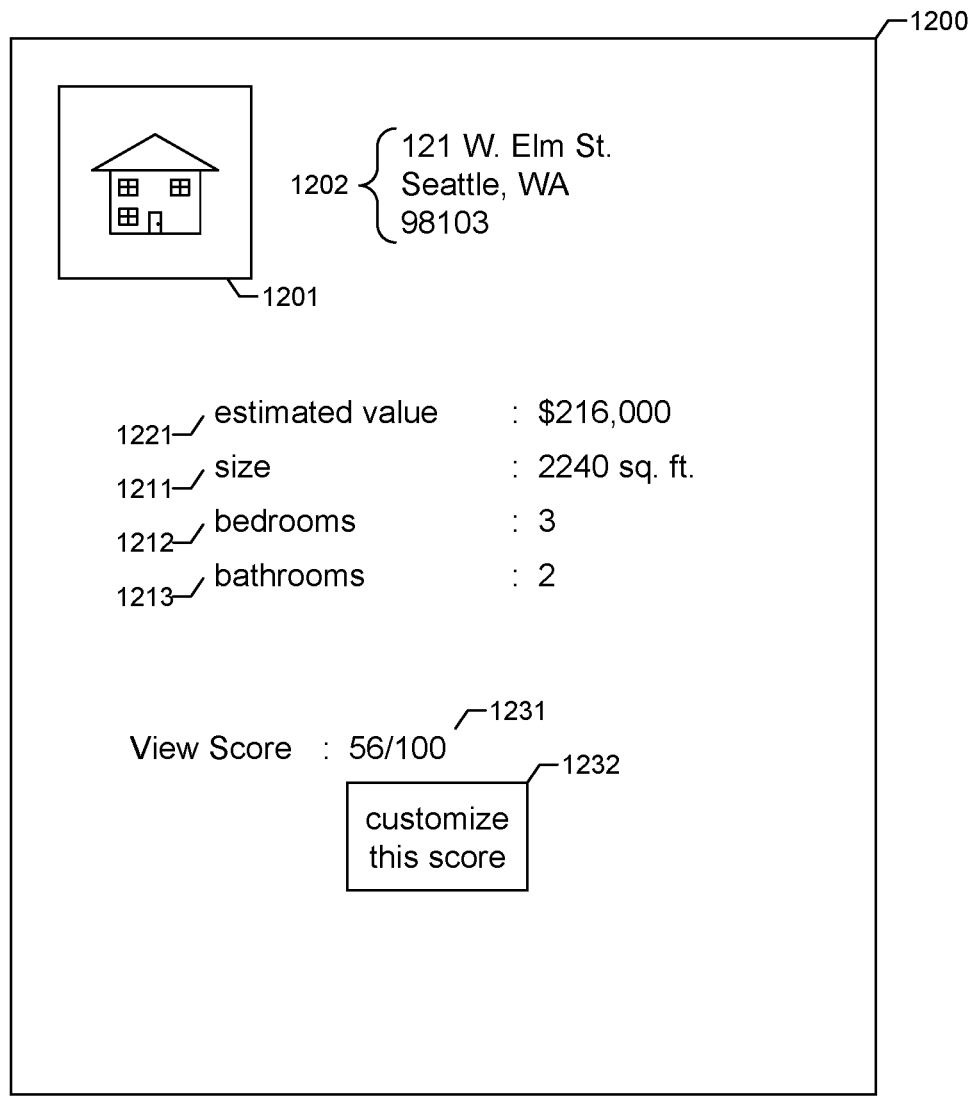
FIG. 12 is a display diagram showing a sample display presented by the facility in some embodiments in which a view score for a home is included with other information about the home.

FIG. 12 is a display diagram showing a sample display presented by the facility in some embodiments in which a view score for a home is included with other information about the home. The user interface 1200, such as a home detail page, includes an image of the home 1201, such as a home photo; the home's address 1202; a value 1221 estimated for the home; a floor area 1211 of the home; a number of bedrooms 1212 in the home; and a number of bathrooms 1213 in the home. The display also includes a view score 1231. The view score shown here corresponds to the sample feature-weighted view score whose determination is discussed above. The display also includes a control 1232 that the user can activate in order to customize the view score shown in the display.

Returning to FIG. 11, in act 1103, the facility displays this score customization control. In act 1104, if the user operates the control, then the facility continues in act 1105. In act 1105, the facility enables the user to specify custom feature preference levels for use in determining customized feature-weighted view scores.

FIG. 13 is a display diagram showing a sample visual user interface presented by the facility in some embodiments to enable a user to specify custom feature preference levels that reflect the user's visual feature preferences. The display 1300 includes a number of fields into which the user can enter the user's preference level for some or all of the features known to the facility. Fields 1311-1314 are for positive categorical features; fields 1321-1324 are for negative categorical features; fields 1316 and 1317 are for positive unique features for a city (Seattle) associated with the user; and field 1326 is for a negative unique feature in that city. As shown, the fields contain the preference levels and the facility's standards preference levels. The user can alter any or all of these, and activate a submit control 1330 to create a custom set of feature preference levels. While some features are referred to herein as "positive" or "negative," the user can enter a preference level of either sign in any field.

FIG. 14 is a display diagram showing a sample display presented by the facility in some embodiments containing feature preference levels as adjusted by a user for a custom set of visual feature preference levels for that user. By comparing FIG. 14 to FIG. 13, it can be seen that, in field 1411, the user changed the preference level for mountains from +5 to +9; in field 1412, the user changed the preference level for water from +5 to +6; in field 1413 the user changed the preference level for forests from +5 to +10; in field 1414, the user changed the preference level for skyline from +5 to −4; in field 1417, the user changed the preference level for Space Needle from +8 to +6; and field 1426, the user changed the preference level for Mercer Mess from −2 to −8.

In some embodiments, the facility persistently stores, for the user, the custom set of visual feature preference levels established by the user input.

FIG. 15 is a data structure diagram showing sample contents of a user-feature preference level table used by the facility in some embodiments to store per-user custom preference levels for visual features. In a manner similar to the standard feature preference level table shown in FIG. 10, the user feature preference level table 1500 maps from at least some of the feature IDs identifying features known to the facility to preference levels specified for those features by the user to whom the table corresponds. For example, in row 1511, it can be seen that the user established a preference level of +9 for feature ID 111, in contrast to the standard preference level of +5 for this feature shown in the standard feature preference level table.

Returning to FIG. 11, in act 1106, the facility generates a custom feature-weighted view score for the home, such as by applying the process shown in FIG. 8 to the home using the user feature preference level table. In act 1107, the facility displays the custom feature-weighted view score for the home generated in act 1106. After act 1107, these steps conclude.

Figure 16:
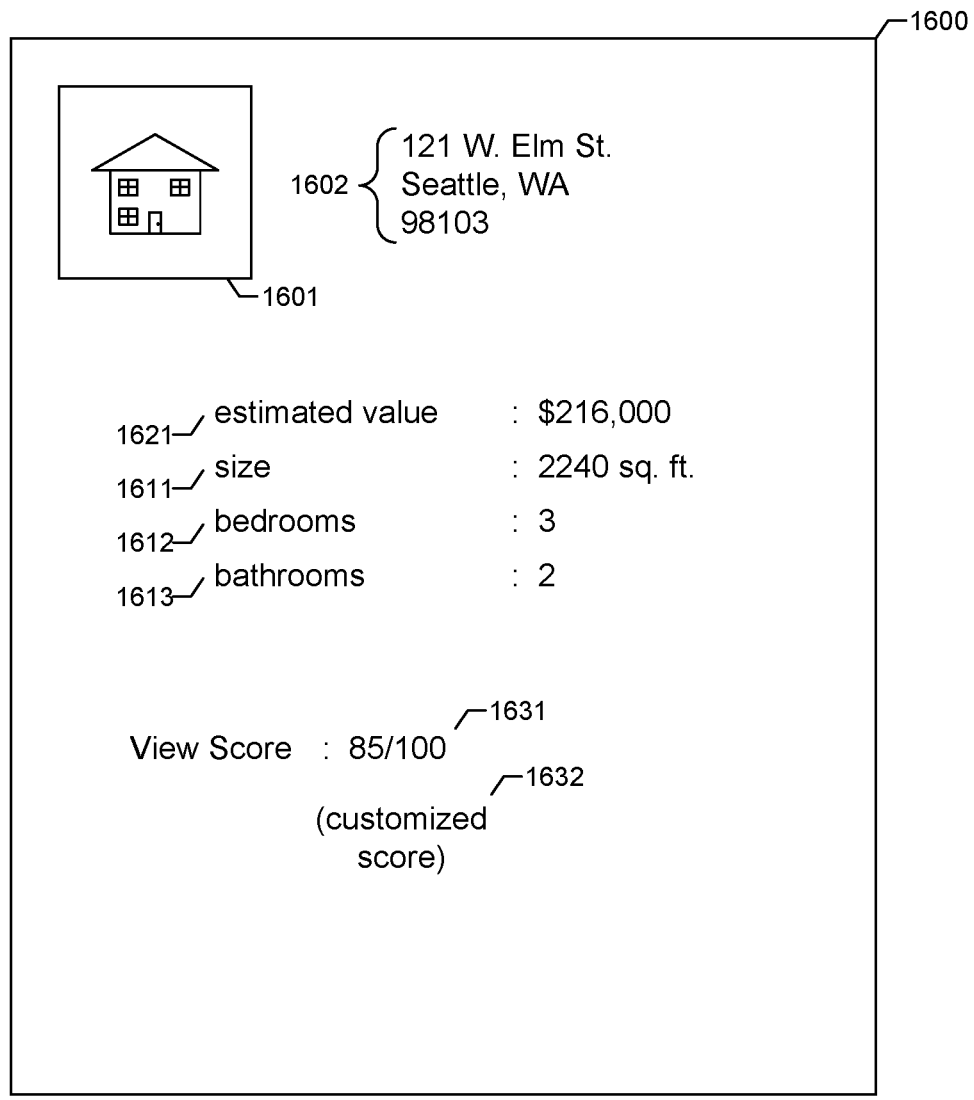
FIG. 16 is a display diagram showing a custom feature-weighted view score generated for the user and the home that was the subject of the display in FIG. 12.

FIG. 16 is a display diagram showing a custom feature-weighted view score generated for the user and the home that was the subject of the display in FIG. 12. By comparing the display 1600 shown in FIG. 16 to the display 1200, shown in FIG. 12, it can be seen that the view score 1631 has changed from 56 in FIGS. 12 to 85 in FIG. 16 to reflect the user's custom set of feature preference levels.

Figure 17:
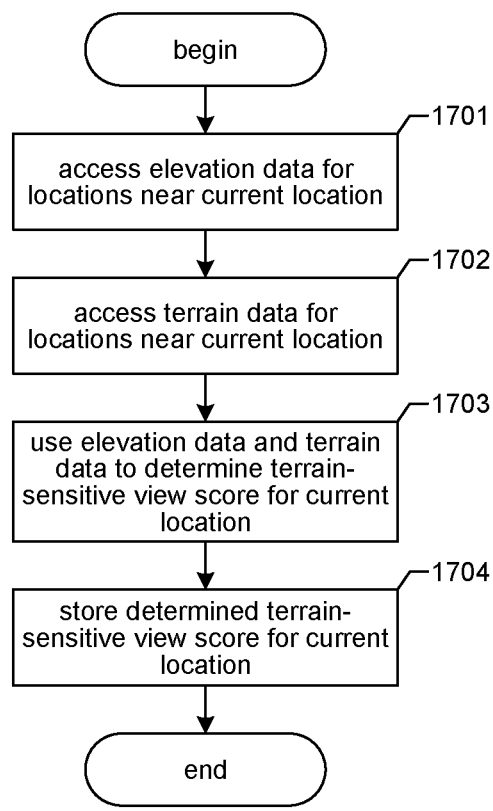
FIG. 17 is a flow diagram showing a process performed by the facility in some embodiments to determine a terrain-sensitive view score for a particular perspective geographic location.

FIG. 17 is a flow diagram showing a process performed by the facility in some embodiments to determine a terrain-sensitive view score for a particular perspective geographic location. In act 1701, the facility accesses elevation data for geographic locations near the perspective geographic location. In act 1702, the facility accesses terrain data for geographic locations near the current perspective geographic location. For example, in some embodiments, in act 1702, the facility accesses a characterization of the terrain in each geographic location in a terrain column 409 of the location table, which can identify such terrain categories as grasslands, waterbody, forest, homes, urban, etc. In act 1703, the facility uses the elevation data accessed in act 1701 and the terrain data accessed access in act 1702 to determine a terrain-sensitive view score for the current location. In some embodiments, this involves identifying rectangles visible from the perspective geographic location based upon the terrain type of the rectangle containing the perspective geographic location, the rectangles whose visibility is being considered, and/or intervening rectangles. In some embodiments, the facility determines the terrain type of each rectangle via on-the-ground surveying; aerial or satellite surveying; records of a variety of types; etc. In act 1704, the facility stores the terrain-sensitive view score determined in act 1701 for the perspective geographic location, such as in terrain-sensitive view score column 410 in the location table. After act 1704, this process concludes.

Figure 18:
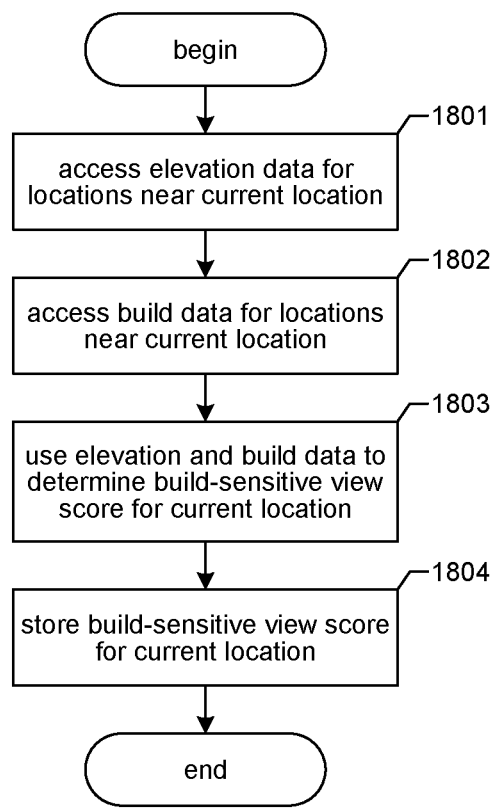
FIG. 18 is a flow diagram showing a process performed by the facility in some embodiments to determine a build-sensitive view score for a perspective geographic location.

FIG. 18 is a flow diagram showing a process performed by the facility in some embodiments to determine a build-sensitive view score for a perspective geographic location. In act 1801, the facility accesses elevation data for geographic locations near the perspective geographic location. In act 1802, the facility accesses build data for geographic locations near the perspective geographic locations, such as in build height column 411 of the location table. In various embodiments, this corresponds to building heights determined from building plans or records; on-the-ground surveying; aerial or satellite surveying; etc. In act 1803, the facility uses the elevation and build data to determine a build-sensitive view score for the perspective location. In some embodiments, this involves treating the elevation for each rectangle as the sum of the rectangle's ground elevation and build height. In act 1804, the facility stores the build-sensitive view score determined in act 1803 for the perspective geographic location, such as in build-sensitive view score column 412 in the location table. After act 1804, these steps conclude.

Figure 19:
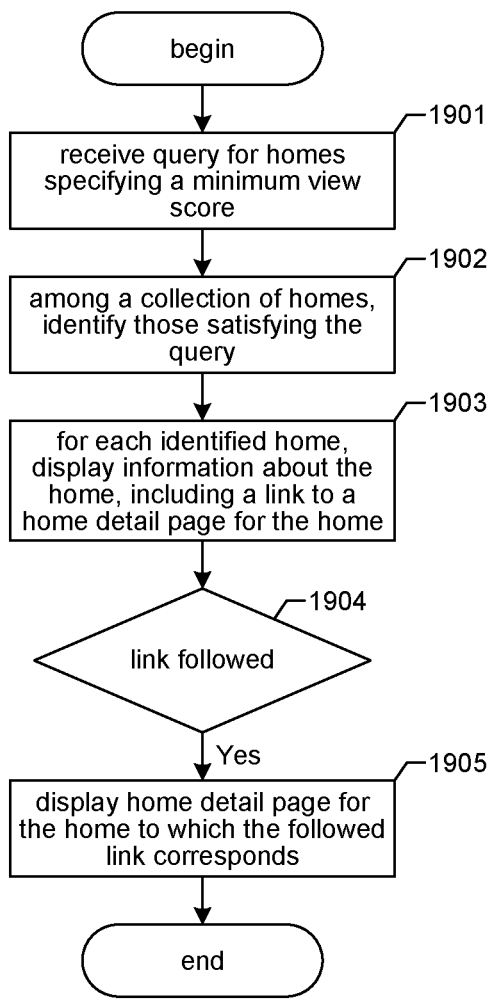
FIG. 19 is a flow diagram showing a process performed by the facility in some embodiments to allow a user to search for homes on the basis of their view scores.

FIG. 19 is a flow diagram showing a process performed by the facility in some embodiments to allow a user to search for homes on the basis of their view scores. In act 1901, the facility receives a query for homes that specifies a minimum view score. In various embodiments, the query can include various other criteria, including, for example, city, neighborhood, number of bedrooms, number of bathrooms, floor space, roof type, listing status, etc. In act 1902, among a collection of homes, such as a collection of homes for each of which the facility stores information usable to evaluate the query for the home, the facility identifies the homes satisfying the query received in act 1901. In act 1903, for each home identified in act 1902, the facility displays information about the home, including a link to a home detail page for the home. In some embodiments, when the search result contains a large number of homes, a subset of the homes are initially displayed, and the user can scroll or page through all the homes in the results set. In act 1904, if a link to a home detail page is followed by the user, then the facility continues in act 1905. In act 1905, the facility displays the home detail page for the home to which the followed link corresponds. In some embodiments, as shown and discussed above, this home detail page includes information about one or more view scores for the home that is its subject. After act 1905, this process concludes.

Figure 20:
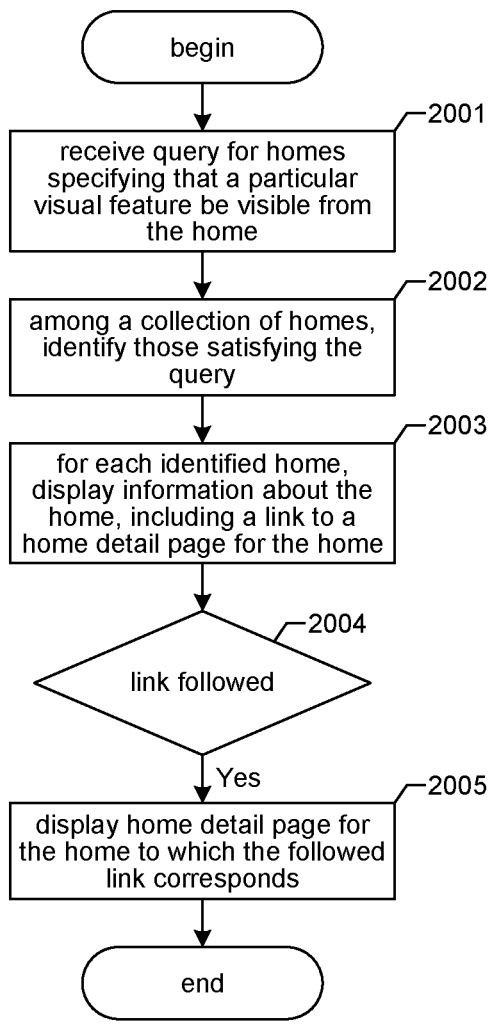
FIG. 20 is a flow diagram showing a process performed by the facility in some embodiments to allow a user to search for homes from which a particular visual feature is visible.

FIG. 20 is a flow diagram showing a process performed by the facility in some embodiments to allow a user to search for homes from which a particular visual feature is visible. In act 2001, the facility receives a query for homes that specifies one or more visual features that are to be visible from the home. As noted above, the query can include various other criteria. In act 2002, among a collection of homes, such as a collection of homes for each of which the facility stores information usable to evaluate the query for the home, the facility identifies the homes satisfying the query received in act 2001. In act 2003, for each home identified in act 2002, the facility displays information about the home, including a link to a home detail page for the home. In some embodiments when the search result, contains a large number of homes, a subset of the homes are initially displayed, and the user can scroll or page through all the homes in the results set. In act 2004, if a link to a home detail page is followed by the user, then the facility continues in act 2005. In act 2005, the facility displays the home detail page for the home to which the followed link corresponds. In some embodiments, as shown and discussed above, this home detail page includes information about one or more view scores for the home that is its subject. After act 2005, this process concludes.

Figure 21:
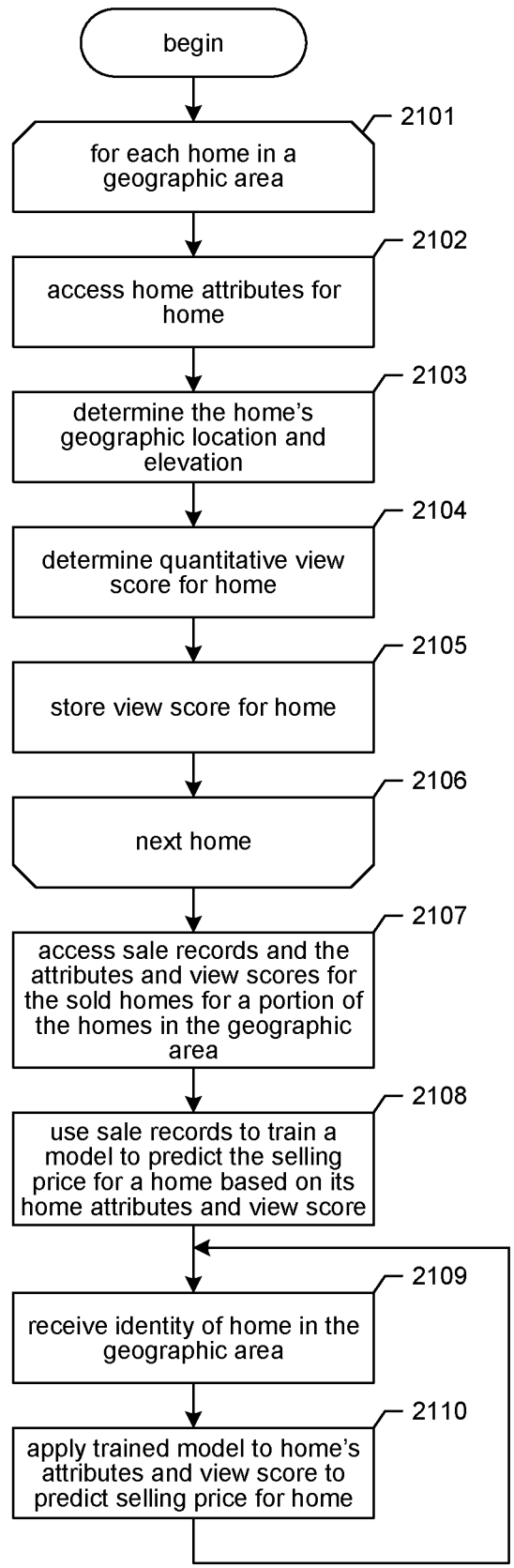
FIG. 21 is a flow diagram showing a process performed by the facility in some embodiments to automatically estimate the value of homes based in part on their view scores.

FIG. 21 is a flow diagram showing a process performed by the facility in some embodiments to automatically estimate the value of homes based in part on their view scores. In acts 2101-2106, the facility loops through each home in a geographic area, such as a census tract, zip code, neighborhood, city, county, state, province, country, or continent. In act 2102, the facility access home attributes for the home. These can include such attributes as geographic location and/or address, number of bedrooms, number of bathrooms, floor area, lot size, number of floors, furnace type, roof type, etc. In act 2103, the facility determines the home's geographic location and elevation, such as by looking these up in the location table. In act 2104, the facility determines a quantitative view score for the home, in any of the manners described herein. In act 2105, the facility stores the view score for the home. In act 2106, if one or more additional homes remain to be processed, then the facility continues in act 2101 to process the next home, else the facility continues in act 2107. In act 2107, the facility accesses sale records for a portion of the homes in the geographic area. These sale records each identify the home that was sold, as well as a selling price at which the home was sold. In act 2108, the facility uses the sale records accessed in act 2107 to train a statistical model to predict the selling price for any home in the geographic area based upon its home attributes and view score. In various embodiments, the facility uses model design and training techniques described in one or more of the following, each of which is hereby incorporated by reference in its entirety: U.S. patent application Ser. No. 11/347,000 filed Feb. 3, 2006, now U.S. Pat. No. 8,676,680, entitled "AUTOMATICALLY DETERMINING A CURRENT VALUE FOR A HOME"; U.S. patent application Ser. No. 11/347,024 filed Feb. 3, 2006, now U.S. Pat. No. 7,970,674, entitled "AUTOMATICALLY DETERMINING A CURRENT VALUE FOR A REAL ESTATE PROPERTY, SUCH AS A HOME, THAT IS TAILORED TO INPUT FROM A HUMAN USER, SUCH AS ITS OWNER"; U.S. patent application Ser. No. 11/524,048 filed Sep. 19, 2006, now U.S. Pat. No. 8,515,839, entitled "AUTOMATICALLY DETERMINING A CURRENT VALUE FOR A REAL ESTATE PROPERTY, SUCH AS A HOME, THAT IS TAILORED TO INPUT FROM A HUMAN USER, SUCH AS ITS OWNER"; U.S. patent application Ser. No. 11/971,758 filed Jan. 9, 2008, now U.S. Pat. No. 8,140,421, entitled "AUTOMATICALLY DETERMINING A CURRENT VALUE FOR A HOME"; and U.S. patent application Ser. No. 13/828,680, filed Mar. 14, 2013, entitled LISTING PRICE-BASED HOME VALUATION MODELS. In cases in which a document incorporated by reference herein is inconsistent with the disclosure of the present application, the disclosure of the present application controls.

In act 2109, the facility receives the identity of a home in the geographic area. In act 2110, the facility applies the model trained in act 2108 to this home's attributes and view score to predict a selling price for this home—that is, to estimate a value for this home. In some embodiments, this value is displayed to users, such as on a home detail page for the home, as in FIGS. 12 and 16. In some embodiments, this value is used as a basis for evaluating home queries that specify an estimated value amount or range. After act 2110, the facility continues in act 2109 to receive the identity of another home in the geographic area to be valued. In some embodiments, this process is used to estimate of value for all or substantially all of the homes in the geographic region. In some embodiments, the facility aggregates the values it estimates for all or substantially all of the homes in the geographic region to obtain a home value index for the geographic region.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer-implemented method, comprising:
accessing a plurality of home sale transactions each identifying a home within a distinguished geographic area and a price at which the identified home was sold;
for each of the accessed home sale transactions:
determining a geographic location of the identified home;
using an elevation at the geographic location of the identified home and elevations of one or more visual features, automatically generating a map diagram that identifies the one or more visual features visible from the identified home;
using the automatically generated map diagram, automatically determining a quantitative view score characterizing a view visible from the identified home; and
accessing attributes of the identified home;
creating a training set comprising one or more training data records, wherein the one or more training data records comprise at least some of the accessed home sale transactions and the corresponding determined quantitative view scores and accessed attributes;
training a machine learning model using the created training set;
generating an estimated value of a particular home in the distinguished geographic area by applying the trained machine learning model on a quantitative view score for the particular home and one or more attributes of the particular home;
measuring a difference between the generated estimated value of the particular home and an actual value of the particular home;
modifying the trained machine learning model using the difference between the estimated value of the particular home and the actual value of the particular home; and
applying the modified machine learning model to the quantitative view score for the particular home and the attributes of the particular home to generate a revised estimated value of the particular home.

2. The method of claim 1, further comprising storing the trained machine learning model.

3. The method of claim 1, further comprising causing the generated revised estimated value to be displayed together with information identifying the particular home.

4. The method of claim 1, wherein the actual value is a selling price of the particular home.

5. The method of claim 1, wherein the quantitative view score for the identified home scores a quantity of surrounding land area determined to be visible from the identified home.

6. The method of claim 1, wherein the map diagram is generated using ray-tracing from the elevation at the geographic location of the identified home to the elevations of the one or more visual features.

7. The method of claim 1, wherein the quantitative view score for the identified home is adjusted for a ground slope determined at the identified home.

8. The method of claim 1, wherein the quantitative view score for the identified home is based on a combination of (1) a quantity of surrounding land area determined to be visible from the identified home and (2) a visibility of distinctive visual features visible from the identified home.

9. The method of claim 1, wherein the quantitative view score for the identified home is based on a quantity of surrounding land area determined to be visible from the identified home in view of terrain types indicated at the identified home and surrounding land area.

10. The method of claim 1, wherein the quantitative view score for the identified home is based on a quantity of surrounding land area determined to be visible from the identified home in view of indications of buildings existing at the identified home and surrounding land area.

11. The method of claim 1, wherein the quantitative view score for the identified home scores the view available from the top of the identified home.

12. A system comprising:
   at least one processor;
   at least one memory coupled to the at least one processor and storing instructions that, when executed by the at least one processor, perform operations, the operations comprising:
      accessing a plurality of home sale transactions each identifying a home within a distinguished geographic area and a price at which the identified home was sold;
      for each of the accessed home sale transactions:
         determining a geographic location of the identified home;
         using an elevation at the geographic location of the identified home and elevations of one or more visual features, automatically generating a map diagram that identifies the one or more visual features visible from the identified home;
         using the automatically generated map diagram, automatically determining a quantitative view score characterizing a view visible from the identified home; and
         accessing attributes of the identified home;
      creating a training set comprising one or more training data records, wherein the one or more training data records comprise at least some of the accessed home sale transactions and the corresponding determined quantitative view scores and accessed attributes;
      training a machine learning model using the created training set;
      generating an estimated value of a particular home in the distinguished geographic area by applying the trained machine learning model on a quantitative view score for the particular home and one or more attributes of the particular home;
      measuring a difference between the generated estimated value of the particular home and an actual value of the particular home; and
      modifying the trained machine learning model using the difference between the estimated value of the particular home and the actual value of the particular home.

13. The system of claim 12, wherein:
   the identified home is within a multiple-floor building; and
   the quantitative view score for the identified home scores a view from an identified floor of the multiple-floor building that the identified home is within.

14. The system of claim 12, wherein:
   the quantitative view score for the identified home is based on a set of feature preference levels determined for a distinguished user; and
   the quantitative view score for the identified home predicts the distinguished user's level of regard for the view from the identified home.

15. The system of claim 12, wherein the quantitative view score for the particular home is at least as large as a specified minimum quantitative view score.

16. The system of claim 12, wherein the quantitative view score for the particular home is based on a specified visual feature being visible from the particular home.

17. The system of claim 16, wherein the at least one processor is further configured to causing the generated estimated value to be displayed together with an indication that the specified visual feature is visible from the particular home.

18. A computer-readable storage medium that does not constitute a transitory propagating signal per se, the computer-readable medium having computer instructions stored thereon which, when executed by one or more processors of a computing system, cause the computing system to perform a process, the process comprising:
   accessing a plurality of home sale transactions each identifying a home within a distinguished geographic area and a price at which the identified home was sold;
   for each of the accessed home sale transactions:
      determining a geographic location of the identified home;
      using an elevation at the geographic location of the identified home and elevations of one or more visual features, automatically generating a map diagram that identifies the one or more visual features visible from the identified home;
      using the automatically generated map diagram, automatically determining a quantitative view score characterizing a view visible from the identified home; and
      accessing attributes of the identified home;
   creating a training set comprising one or more training data records, wherein the one or more training data records comprise at least some of the accessed home sale transactions and the corresponding determined quantitative view scores and accessed attributes;
   training a machine learning model using the created training set; and
   generating an estimated value of a particular home in the distinguished geographic area by applying the trained machine learning model on a quantitative view score for the particular home and one or more attributes of the particular home.

19. The computer-readable medium of claim 18, wherein the quantitative view score for the particular home scores a quantity of surrounding land area determined to be visible from the particular home.

20. The computer-readable medium of claim 18, wherein the map diagram is generated using ray-tracing from the elevation at the geographic location of the identified home to the elevations of the one or more visual features.

21. The computer-readable medium of claim 18, wherein the quantitative view score for the particular home is adjusted for a ground slope determined at the particular home.

22. The computer-readable medium of claim 18, wherein the quantitative view score for the particular home is based on a combination of (1) a quantity of surrounding land area determined to be visible from the particular home and (2) a visibility of distinctive visual features from the particular home.

23. The computer-readable medium of claim 18, wherein the quantitative view score for the particular home is based on a quantity of surrounding land area determined to be visible from the particular home in view of terrain types indicated at the particular home and surrounding land area.

24. The computer-readable medium of claim 18, wherein the quantitative view score for the particular home is based on a quantity of surrounding land area determined to be visible from the particular home in view of indications of buildings existing at the particular home and surrounding land area.

25. The computer-readable medium of claim 18, wherein the quantitative view score for the particular home scores the view available from the top of the particular home.

* * * * *